United States Patent [19]

Pratt et al.

[11] Patent Number: 5,026,776

[45] Date of Patent: Jun. 25, 1991

[54] OLEFINIC IMPACT MODIFIERS FOR, AND BLENDS WITH, THERMOPLASTIC POLYESTERS RESINS

[75] Inventors: Charles F. Pratt, Brasschaat, Belgium; Shrikant V. Phadke; Errol Olivier, both of Baton Rouge, La.

[73] Assignee: General Electric Company, Pittsfield, Mass.

[21] Appl. No.: 235,432

[22] Filed: Aug. 23, 1988

Related U.S. Application Data

[63] Continuation-in-part of Ser. No. 161,361, Feb. 22, 1988, abandoned, which is a continuation-in-part of Ser. No. 4,089, Jan. 16, 1987, abandoned.

[51] Int. Cl.$^5$ .............................................. C08L 67/02
[52] U.S. Cl. .................................... 525/64; 525/176; 525/177
[58] Field of Search ......................... 525/64, 177, 176

[56] References Cited

U.S. PATENT DOCUMENTS

| | | | |
|---|---|---|---|
| 3,769,260 | 10/1973 | Segal | 525/177 |
| 3,862,265 | 1/1975 | Steinkamp | 264/176 R |
| 3,868,433 | 2/1975 | Bartz | 525/286 |
| 3,884,882 | 5/1975 | Cuywood | 525/205 |
| 3,886,227 | 5/1975 | Van Brederode | 525/286 |
| 3,953,541 | 4/1976 | Fuji | 525/286 |
| 4,026,967 | 5/1977 | Flexman | 525/286 |
| 4,172,859 | 10/1979 | Epstein | 428/402 |

FOREIGN PATENT DOCUMENTS 85040154 3/1985 Japan .
86004076 7/1986 PCT Int'l Appl. .

*Primary Examiner*—Patricia Short
*Attorney, Agent, or Firm*—Rockey and Rifkin

[57] ABSTRACT

Thermoplastic polyester, copolyester and polyblend molding compositions impact-modified by glycidyl methacrylate grafted EPDM exhibit high impact strength combined with good knit-line characteristics, when the grafted comonomer content exceeds 2 percent by weight in the impact modifier, it has a gel content in the range of from about 10 to about 80 weight percent.

25 Claims, No Drawings

OLEFINIC IMPACT MODIFIERS FOR, AND BLENDS WITH, THERMOPLASTIC POLYESTERS RESINS

This application is a continuation-in-part of Pat. application Ser. No. 161,361, filed Feb. 22, 1988, now abandoned, which is a continuation-in-part of Pat. application Ser. No. 004,089 abandoned, filed Jan. 16, 1987 and entitled "Olefinic Impact Modifiers For, And Blends With, Thermoplastic Resins" now abandoned.

This invention relates to impact modified thermoplastic molding compositions and, more particularly, to glycidyl methacrylate or glycidyl acrylate grafted EPDM impact modifiers for thermoplastic polyester, copolyester and polyblend molding compositions.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319, and in Pengilly, U.S. Pat. No. 3,047,539. These patents disclose that the polyesters are particularly advantageous as film and fiber formers.

With the development of molecular weight control, the use of nucleating agents and two-step molding cycles, poly(ethylene terephthalate) or PET has become an important constituent of injection moldable compositions. Further, poly(1,4-butylene terephthalate) or PBT, because of its very rapid crystallization from the melt, is uniquely useful as a component in such compositions. Work pieces molded from such polyester resins, in comparison with other thermoplastics, offer a high degree of surface hardness and abrasion resistance, high gloss and lower surface friction.

Furthermore, in particular, poly(1,4-butylene terephthalate) is much simpler to use in injection molding techniques than poly(ethylene terephthalate). For example, it is possible to injection mold poly(1,4-butylene terephthalate) at low mold temperatures of from about 30° to 60° C. to produce highly crystalline, dimensionally stable moldings in short cycle times. Because of the high rate of crystallization, even at low temperatures, no difficulty is encountered in removing the moldings from the molds. Additionally, the dimensional stability of poly(1,4-butylene terephthalate) injection moldings is very good even at temperatures near or well above the glass temperature of poly(1,4-butylene terephthalate).

However, the impact resistance of unmodified polyesters is relatively low at room temperature and below. Thus for many applications, it is desirable to have polyesters which are impact resistant at relatively high and relatively low ambient temperatures. Yet, the other mechanical properties such as modulus of elasticity, tensile strength at yield and at break should be impaired either not at all or only to an acceptable degree.

It has been recommended in various places to improve the impact resistance of polyesters by adding other polymers including interpolymers and copolymers. Specifically, the impact strength of thermoplastic linear crystalline polyesters, including poly(1,4-butylene terephthalate), has been improved by the incorporation therein of an ethylene-propylene nonconjugated diene rubbery terpolymer (EPDM). Although EPDM is capable of impact-modifying BPT polyester compositions, e.g., Coran et al., U.S. Pat. No. 4,141,863 and Tanaka et al., U.S. Pat. No. 4,290,927, such compositions often suffer from "incompatibility" resulting in streaks or delamination of molded or extruded parts.

In Hepp, European Pat. application No. 0 149 192, published July 24, 1985, there is disclosed a thermoplastic molding composition consisting of a thermoplastic resin, e.g., polyester, copolyester or block copolyester and an EPDM epoxidized with, e.g., m-chloroperozybenzoic acid. The examples given by this reference in Tables 1, 2 and 3 do not, however, exhibit a combination of good impact strength and acceptable knit-line characteristics.

Siegel, U.S. Pat. No. 3,769,260 discloses that a functionalized rubber improves impact strength of polyesters, and suggests a range of 0.02 to 20 microns in diameter for the dispersed rubber phase particles.

Epstein, U.S. Pat. No. 4,172,859, discloses the use of random copolymers containing various polar monomers. He also alludes to the use of materials grafted with various polar monomers, e.g., glycidyl methacrylate (GMA), to impact modify thermoplastic polyesters including PBT and PET. However, this patent does not deal with and therefore fails to recognize several factors that are critical to the function of EPDM-g-GMA materials as impact modifiers for PBT systems. First, it does not recognize the benefits of reactive glycidyl (meth)acrylates as graft monomers over non-reactive polar monomers such as maleic anhydride or n-vinyl pyrrolidone. Second, in Col. 5, lines 35-36, Epstein discounts crosslinking (gel formation) as unnecessary to the function of such modifiers, and states that crosslinking may be harmful. Third, the Epstein patent does not teach the need for a specific rang of grafted GMA content in the rubber. Finally, Epstein discloses modifier particle sizes between 0.01-3.0 micron, and expressly states a distinct criticality for particle size substantially entirely below 1 micron in size.

In Olivier, U.S. Pat. application, Ser. No. 690,613 abandoned, filed Jan. 11, 1985, there are disclosed glycidyl methacrylate grafted EPDM impact modifiers for polyester resins. In the specific examples, he describes materials having gel contents of less than 5 percent or more than 48.7, with nothing in between. With little or no gel contents, i.e., 5 percent or less, he states that thermoplastic polyester compositions with high impact strengths are obtained. With high gel contents, specifically above 48.7%, Olivier discloses that the material was a much poorer impact modifier than one which was free of gel. In any event, the specific examples have subsequently been found not to provide an acceptable combination of good impact strength and knit-line characteristics. Moreover, no mention is made of any effect of impact modifier particle size on these important characteristics.

It has now been unexpectedly discovered that thermoplastic polyester compositions comprising glycidyl methacrylate grafted EPDM (EPDM-g-GMA) impact modifiers can be prepared that possess high impact strength combined with good knit-line characteristics if careful attention is paid to graft monomer content, gel content, and rubber particle size in the impact modifier. The gel content preferably used is especially unexpected because it happens to fall in a range not actually investigated by Olivier. Compositions with these important properties have been developed as a result of numerous trials which have established that it is required to use EPDM-g-GMA materials with greater than 2.0 percent, preferably greater than 3 percent, and especially preferably greater than 4 percent, GMA contents, and gel contents in the 10–80 percent range. Impact properties are also vastly improved in thermoplastic blends with well-dispersed rubber particles in which more than 60 percent, preferably more than 70 percent by weight of the rubber particles are 1 micron or larger in diameter. Nothing in the prior art renders such parameters obvious, and they cannot be developed by mere routine optimization experiments.

SUMMARY OF THE INVENTION

In accordance with the present invention are provided impact modifiers, impact modified thermoplastic compositions, and methods for their production, said modified thermoplastic compositions comprising:

(a) a high molecular weight thermoplastic polyester resin, and (b) an effective amount of an impact modifier comprising an EPDM terpolymer grafted with 2% or more by weight, based on said terpolymer of glycidyl methacrylate or glycidyl acrylate or a mixture thereof, alone, or grafted in further combination with a $C_1$–$C_{18}$ alkyl methacrylate or acrylate or a mixture thereof, component (b) having a gel content in the range of 10 to 80 percent. Preferably, greater than 60 percent by weight of the rubber particles therein are of 1 micron or larger in diameter.

Also preferred herein is a composition as defined above wherein the EPDM-glycidyl ester grafted terpolymer is present in an amount of, approximately, 10 to 55 percent by weight based on the total composition. Special mention is made of articles blow-molded from the compositions of this invention.

DETAILED DESCRIPTION OF THE INVENTION

The high-molecular weight linear polyesters used in the practice of the present invention are polymeric glycol esters of terephthalic acid and isophthalic acid. They are available commercially or can be prepared by known techniques, such as by the alcoholysis of esters of phthalic acid with a glycol and subsequent polymerization, by heating glycols with free acids or with halide derivatives thereof, and similar processes. These are described in U.S. Pat. No. 2,465,319 and U.S. Pat. No. 3,047,539, and elsewhere.

Although the glycol portion of the polyester can contain from 2 to 10 carbon atoms, it is preferred that it contain from 2 to 4 carbon atoms in the form of linear methylene chains.

Preferred polyesters will be of the family consisting of high molecular weight, polymeric glycol terephthalates or isophthalates having repeated units of the general formula:

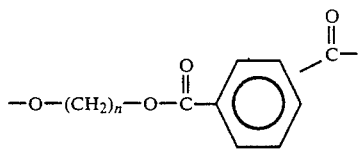

wherein n is a whole number of from 2 to 4, and mixtures of such esters, including copolyesters of terephthalic and isophthalic acids of up to about 30 mole percent isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.7 deciliters/gram and, preferably, at least 0.8 deciliters/gram as measured in a 60:40 phenol-tetrachloroethane mixture at 30° C. At intrinsic viscosities of at least about 1.0 deciliters/gram, there is a further enhancement of toughness of the present compositions.

Copolyesters useful for the invention are preferably prepared from terephthalic acid and/or isophthalic acid and/or a reactive derivative thereof and one or more glycols, which may be a straight or branched chain aliphatic/cycloaliphatic glycol. Illustratively, the glycol will be ethylene glycol; 2-methyl-1,3-propanediol, 1,4-butanediol; 1,5-pentanediol; 1,6-hexanediol; 1,9-nonanediol; 1,10-decanediol; neopentylglycol; 1,4-cyclohexanediol; 1,4-cyclohexanedimethanol; a mixture of any of the foregoing, or the like. Illustrative of suitable aliphatic dicarboxylic acids for the mixed aromatic/aliphatic embodiments are suberic, sebacic, azelaic, and adipic acids and the like.

The copolyesters may be prepared by ester interchange in accordance with the standard procedures. The copolyesters may preferably be derived from at least 50% butylene terephthalate units.

The block copolyesters useful in the composition of this invention are prepared by the reaction of terminally reactive poly(1,4-butylene terephthalate), preferably of low molecular weight, and a terminally reactive copolyester or aliphatic polyester or both in the presence of a catalyst for transesterification, such as zinc acetate, manganese acetate, titanium esters, and the like. The terminal groups can comprise hydroxyl, carboxyl, carboalkoxy, and the like, including reactive derivatives thereof. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. The result of reaction between two terminally reactive groups, of course, must be an ester linkage. These copolymers are described in a German Pat. application No. P 27 56 167.7.

The copolyester designated component of these block copolyesters may be terminally reactive segments of copolyesters as described above. These copolyesters are most preferably derived from an aliphatic glycol and a mixture of aromatic and aliphatic diabasic acids in which the mole ratio concentration of aromatic to aliphatic acids is from between 1 to 9 to about 9 to 1, with an especially preferred range being from about 3 to 7 to about 7 to 3.

The terminally reactive aliphatic polyester component of these block copolyesters will contain substantially stoichiometric amounts of the aliphatic diol and the aliphatic dicarboxylic acid, although hydroxy-containing terminal groups are preferred.

In addition to their ease of formation by well known procedures, both the aforementioned aromatic/aliphatic copolyesters and aliphatic polyesters are commercially available. One source for such materials is the Ruco Division/Hooker Chemical Company, Hicksville, New York, which designates its compounds as "Rucoflex".

The block copolyesters used in the invention preferably comprise from about 95 to about 50 parts by weight based on the block copolyesters of poly(1,4-butylene terephthalate) segments. The poly(1,4-butylene terephthalate) blocks, before incorporation into the block copolyesters, will preferably have an intrinsic viscosity of about 0.1 dl./g. and, preferably, between about 0.1 and about 0.5 dl./g., as measured in a 60:40 mixture of phenol-tetrachloroethane at 30° C. The balance 50 to 5 parts by weight of the copolyester will comprise blocks of the aforementioned aromatic/aliphatic copolyesters and/or aliphatic polyesters.

As will be understood by those skilled in the art, the poly(1.4-butylene terephthalate) block can be straight chain or branched, e.g., by use of a branChing component, e.g., from about 0.05 to about 1 mole percent, based on terephthalate units of a branching component which contains at least 3 ester-forming groups. This can be a polyol, e.g., pentaerythritol, trimethylol-propane, and the like or a polybasic acid compound, e.g., trimethyl trimestate, and the like.

Blends of the foregoing homopolymers, copolymers and/or block copolymers or derivatives thereof are also useful for the invention.

The glycidyl ester grafted terpolymer additives of this invention may be prepared from any of the well known EPDM terpolymer rubbers. EPDM terpolymers useful for preparing the grafted materials used in the invention are commercially available, e.g., Copolymer Corp. (EPSYN ® 55), or may be prepared using a Ziegler-type catalyst. The preparation of typical EPDM terpolymers is described, for example, in Gresham et al., U.S. Pat. No. 2,933,480; Tarney, U.S. Pat. No. 3,000,866; Guglielmino et al., U.S. Pat. No. 3,407,158; Gladding, U.S. Pat. No. 3,093,621 and U.S. Pat. No. 3,379,701. These terpolymers are characterized by the absence of chain or backbone unsaturation and the presence of sites of unsaturation in groups which are pendant to or are in cyclic structures outside of the main polymer chain.

Useful EPDM terpolymers for the production of the glycidyl ether grafted terpolymers used in this invention comprise ethylene, a $C_3$ to $C_{16}$ straight or branched chain alpha-olefin, preferably propylene, and a non-conjugated diolefin, preferably propylene, and a non-conjugated diolefin. Satisfactory non-conjugated dienes that may be used as the third monomer in the terpolymer include straight chain dienes such as 1,4-hexanediene, cyclic dienes such as cyclooctadiene and bridged cyclic dienes such as ethylidene norbornene.

Preferred EPDM terpolymers are comprised of about 10-95, preferably 45-70 mole percent, by weight ethylene, about 5 to 90, preferably 30-55 mole percent polypropylene and a minor amount of diene monomer, most preferably a polyunsaturated bridged ring hydrocarbon or halogenated derivative thereof, most preferably 5-ethylidene-2-norbornene. These EPDM terpolymers have a melt index of approximately 79 g/10 min., a Mooney viscosity of approximately 78 and a gram molecular weight of about 21,600.

The backbone rubber is subsequently graft modified with a graft monomer of epoxy functional acrylate or methacrylate. Although grafting may occur by various reaction mechanisms at practically any point on the backbone rubber, generally, the grafting takes place at an unreacted point of unsaturation on the polyene. For this reason, it is desirable to make use of an ethylene, mono-olefin, polyene backbone rubber having at least two unsaturated carbon-to-carbon linkages per 1000 carbon atoms and little additional benefit is derived from the use of unsaturated backbone rubber having more than 20 carbon-to-carbon double bonds per 1000 carbon atoms. In the preferred practice of this invention, use if made of an unsaturated rubber having from 4–10 carbon-to-carbon double bonds per 1000 carbon atoms.

The point of ethylenic unsaturation on the epoxy functional graft monomer must be sufficiently reactive to react directly with the unsaturation of the polyene; or to react with a graft chain originating at, or for combination with, the polyene unsaturation. Such levels of reactivity require the alpha-beta situation of the ethylenic unsaturation as found in, for example, an epoxy functional esters of acrylic acid or alkyl acrylic acid. A free radical initiator, such as a dialkyl peroxide may be used to promote the graft reaction. In order to achieve the desired level of gel content, it is desirable to make use of an initiator in an amount of at least 0.3 percent by weight of the unsaturated rubber. While more than 3 percent by weight initiator can be used to achieve the desired gel content, it is preferred to limit the upper range to about 3% by weight of the unsaturated rubber. It will be noted from the following examples that a higher amount of catalyst is desired to achieve the level of gel content when the reaction is carried out in solution (examples 1–3) for production of the impact modifier, while the desired level of gel content can be achieved at lower levels of catalyst content when the reaction is carried out in bulk, as illustrated in examples 4–9. An amount of catalyst less than about 0.3 percent by weight of the unsaturated rubber can be used, but the amount of working required for gel formation of the desired levels results in an undesirable amount of degradation of the backbone rubber.

Preferred as the graft monomer herein is glycidyl methacrylate (GMA).

The graft chain formed by the grafting process on the backbone rubber need not be a homopolymer or even be of entirely epoxy functional graft monomers. For example, combinations of the two above-mentioned epoxy functional graft monomers may be used as well as combinations of either or both with other $C_1$–$C_{18}$ alkyl acrylates or methacrylates, wherein $C_1$–$C_{18}$ may be straight chain or branched, e.g., methyl, ethyl, isopropyl, 2-ethyl-hexyl, decyl, n-octodecyl, and the like. Particularly useful such comonomer grafts are grafts of glycidyl acrylate and/or glycidyl methacrylate and methyl methacrylate.

It is critical to the present invention that the gel content of the elastomeric material be controlled either during polymerization or in subsequent processing to achieve a value of greater than about 10% by weight and less than 80%. With a gel content too low impact strength is high, but knit-line strength is low. With a gel content too high, both impact strength and knit-line strength are low.

Gel content in an especially convenient analysis, according to ASTM D-3616, is measured by the weight percent of remaining elastomeric material after extraction in hexane or toluene. Gel content is an indication of the degree of cross-linking in the elastomeric material. Of course, persons skilled in the art are familiar with a variety of ways to control the degree of cross-linking and thus the gel content can be determined by numerous other methods. The cross-link reaction may be a direct rubber backbone to rubber backbone joining, an epoxy functionality to epoxy functionality or rubber backbone joining, or a graft chain free radical addition to a second graft chain or to a rubber backbone. Further, cross-linking may be achieved by the addition of a cross-linking agent to effectively achieve any of the above reactions. Thus, any of several steps to control gel content may be taken. Thermal aging will increase gel content. Increasing the amount of epoxy functional graft monomer will increase gel content. Increasing the amount of polyene monoene monomer in the rubber backbone will increase gel content. The addition of a cross-linking agent will increase gel content. The use of graft monomers with greater tendency to cross-link will increase gel content, for example, a homopolymer graft of glycidyl acrylate will cross-link more readily than a homopolymer graft of glycidyl methacrylate or a copolymer graft of glycidyl acrylate and methyl methacrylate.

As stated above, gel content of the elastomeric material used in this invention should range up to no higher than about 80%. Although cross linking can be carried on well past this level, as has been mentioned, high levels of cross-linking diminish the dispersibility of the elastomeric material and lead to non-uniform mixing Also, such high levels of localized cross-linking will create brittle areas within the elastomeric material which will decrease rubbery character. It is apparent that cross-linking should be uniformly dispersed throughout the elastomeric material.

It is preferred in the present invention that the elastomeric material have an epoxy functionality of at least 2.5 epoxy functionalities per 1000 carbon atoms, and preferably between about 5.0 and 13 epoxy functionalities per 1000 carbon atoms. Epoxy functionality means those epoxy sites which remain in the impact modifier resin after the loss of such functionalities as may react in the cross-linking reaction. In the instance of the use of GMA or GA as the epoxy functional graft monomer, a graft level of about 2% by weight is necessary to provide the minimum level of epoxy as shown above. The maximum is not particularly critical, e.g., up to 10-15% by weight can be used.

The grafting reaction may be carried out in solvent solution with the unsaturated rubber backbone present in a concentration which may range from 10-30 percent by weight, with constant stirring, at an elevated temperature within the range of 125-200° C. for a time ranging from ½ to 2 hours. The reaction condition can be varied depending somewhat upon the type and amount of catalyst and temperature conditions, as is well known to those skilled in the art. Where high amounts of graft monomer are to be attached to the backbone rubber, it has been found to be advantageous to carry out the graft reaction in the melt state of the backbone rubber, i.e., extruder grafting. This process is simply performed by feeding the backbone rubber, an excess of graft monomer, and an appropriate catalyst to a melt extruder and mixing and reacting the feed components at an elevated temperature.

The above described elastomeric material is physically dispersed in a thermoplastic polymer melt to form discrete particles of rubbery polymer in a continuous phase of a thermoplastic matrix resin or blend. At least an impact strength improving amount of elastomeric material is dispersed in the matrix resin. Generally, this requires that the elastomeric material constitute at least 1.5 percent by weight, preferably 3.5 to 80 percent, most preferably 10 to 55 percent, by weight based on total thermoplastic content, including elastomeric material, of the molding composition. It will be apparent that while the indicated composition range is optimum for making toughened rigid plastic articles, acceptable molding materials can still be made from mixtures with rubber contents much higher than this range. Thermoplastic elastomer type molding compounds are produced when the elastomer content exceed 55 weight percent, and even mixtures above the phase inversion composition, i.e., those in which the thermoplastic resin phase is semi- or non-continously interdispersed in a rubbery polymer matrix can be used to make flexible molded articles with excellent properties. 80 weight percent elastomer is a typical upper limit. Compounding of the rubber and thermoplastic resin is simply carried out by standard techniques, for example, by simple melt blending or dry mixing and melt extruding at an appropriate elevated temperature for any given thermoplastic matrix. The resultant admixture is then molded into a thermoplastic piece of specific dimensions or further extruded into a film or sheet product.

It is important to the final properties of molded parts containing elastomeric material that there is sufficient mixing in the extrusion of the resin melt. Herein, several reactions have been taught or suggested to take place in the extruder and such are, of course, effected by mixing we well as residence time in the extruder. Thus, thorough mixing of the polymer melt is suggested and, depending upon the equipment employed, two successive extrusions of the melt may be required.

As has been mentioned, in preferred compositions the particle size of the rubber grafted with glycidyl esters will be selected to provide that at least 60 weight percent of such particles, and preferably more than 70 weight percent of them are greater than 1 micron in diameter. Such compositions combine optimum notched Izod impact strength, with knit-line strength, and these are vastly superior to those obtained with compositions wherein, for example, only about 50 weight percent of the particles exceed 1 micron in diameter. Particle size can be measured in any of the ways known in this art, but an especially convenient way is to use a computerized particle size analyzer to measure photomicrographs of scanning electron microscopy (SEM) images.

Compounding can be carried out in conventional equipment. For example, after pre-drying the thermoplastic polyester resin, e.g., at 125° C. for 4 hours, a single screw extruder is fed with a dry blend of the polyester and the additive ingredients, the screw employed having a long transition and metering section to insure melting. On the other hand, a twin screw extrusion machine, e.g., a 28 mm Werner Pfleiderer machine can be fed with resin and additives at the feed port. In either case, a generally suitable machine temperature will be about 450° F. to 570° F.

The compounded composition can be extruded and cut up into molding components such as conventional granules, pellets, etc., by standard techniques.

The compositions of this invention can be molded in any equipment conventionally used for thermoplastic compositions. For example, with poly(1,4-butylene terephthalate) good results will be obtained in an injection molding machine, e.g., of the Newbury type with conventional cylinder temperature, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well known techniques can be used. For example, a nucleating agent such as LIOH, sodium stearate, graphite or a metal oxide, e.g., ZnO or MgO can be included and standard mold temperatures of from about 150° F. to 230° F. will be used. Especially suitable in blow-molding.

It is to be understood that the foregoing compositions may contain other additives known in the art, including, but without limitation, nucleating agents, mold release agents, flow promoters, coloring agents, coupling agents, and stabilizers. The elastomeric containing molding compositions of this invention may be used as molding pellets and may contain pigments, dyes, stabilizers, plasticizers, and the like. One may readily determine which are necessary and suitable for a particular application.

DESCRIPTION OF THE PREFERRED EMBODIMENTS

The following examples illustrate the invention. The claims are not to be construed to be limited by them in any manner whatsoever.

In the examples the following designations are used to denote the materials and physical test employed:

| Physical Tests | |
|---|---|
| RSV | Reduced solution viscosity measured in a 0.1 solution of decalin at 135° C. |
| Mooney Viscosity | ASTM D1646, ML + 4 (125° C.) |
| Gel content | ASTM D-3616 |
| Notched Izod Impact | ASTM D256 |
| Unnotched Double Gate Izod Impact | Variation of ASTM D256 where the test piece is double gate injection molded from opposite ends under conditions which center the tack line between the ends of the test piece. |

| Ingredients | |
|---|---|
| Backbone Rubber A (EPDM A) | EPSYN ® resin; EPDM rubber; 2.2 RSV; 9 C = C/1000 C (8% by weight of polyene 5-ethylidene-2-norbornene); ethylene/propylene ratio = 2/1; Mooney Viscosity = 40; Copolymer Rubber & Chemical Corp. |
| Backbone Rubber B (EPDM B) | EPSYN ® 55 resin; EPDM rubber; 2.3 RSV; 9 C = C/1000 C (8% by weight of polyene 5-ethylidene-2-norbornene); ethylene/propylene ratio = 2/1; Mooney Viscosity = 50; Copolymer Rubber & Chemical Corp. |
| Backbone Rubber C (EPDM C) | EPSYN ® E901 resin; EPDM rubber; 2.2 RSV; 4.5 C = C/1000 C (4% by weight of polyene 5-ethylidene-2-norbornene); E/P ratio 4/1; Mooney viscosity = 50; Copolymer Rubber & Chemical Corp. |
| Antioxidant | IRGANOX ® 1076 phenolic antioxidant; Ciba Geigy Corporation |
| Initiator A | Hercules Di-Cup ® free radical initiator; dicumyl peroxide |
| Initiator B | 2.5-dimethyl-2,5-di(t-butyl-peroxy) hexane |
| Poly(1,4-butylene terephthalate)/PBT | VALOX 315 resin; General Electric Co. |

Also in these examples, the following abbreviations are used:
PBT—poly(1,4-butylene terephthalate)
EPM—ethylene-propylene copolymer
EPDM—ethylene-propylene-polyene terpolymer
GMA—glycidyl methacrylate
GA—glycidyl acrylate
MMA—methyl methacrylate

EXAMPLES 1 AND 2

(a) Formulations of monomer grafted EPDM resin are prepared as follows: 100 weight parts of backbone rubber A; 0 1 weight parts of antioxidant; and approximately 300 weight parts of hexane are charged to a one gallon Hastelloy C reactor. The reactor is sealed, flushed with $N_2$, and heated to 155° C. Specified weight parts of monomer (GMA or GA or GMA/MMA, as the case ma be) in approximately 15 weight parts hexane are metered into the reactor. This is followed by 2 weight parts of initiator A in approximately 15 weight parts of hexane. The solution was stirred at 500–600 rpm for one hour at 155° C. and 200–250 psig. After the reaction mixture has cooled down, the product is recovered by precipitation in acetone followed by drying overnight at 75° C. under pump vacuum.

(b) Thermoplastic compositions comprising poly(1,4-butylene terephthalate) (PBT), and the rubber grafted material prepared in step (a) are extruded once in a single screw extruder. Zone temperatures are 150° C., the die temperature is 240° C. and screw speed is 150 rpm. The water cooled strands of elastomeric material are cut into test pieces and notched Izod impact is measured according to ASTM D256. The compositions and results obtained are set forth in Table 1.

TABLE 1

| Thermoplastic Compositions: Blends Extruded In A Single Screw Extruder | | | | | |
|---|---|---|---|---|---|
| Example | 1A* | 1B* | 1C* | 1 | 2 |
| Compositions (parts by weight) | | | | | |
| PBT[a] | 80 | 80 | 80 | 80 | 80 |
| EPDM C[b] | 20 | — | — | — | — |
| EPM-g-N-vinylpyrrolidone[c] | — | 20 | — | — | — |
| EPM-g-maleic anhydride[d] | — | — | 20 | — | — |
| EPDM-g-GMA[e] | — | — | — | 20 | — |
| EPDM-g-GA/MMA[f] | — | — | — | — | 20 |
| Properties | | | | | |
| Notched Izod Impact (ft. lb./in) | 2.0 | 3.3 | 2.1 | 13.7 | 19.0 |

*Control
[a]VALOX ® 315, General Electric Company
[b]EPSYN ® E901. Copolymer Rubber and Chemical Corporation.
[c]EPSYN ® 510, see footnote b for source, grafted with 5.8 wt. % N-vinyl pyrrolidone
[d]EPSYN ® 7006, see footnote b for source, grafted with 0.6 wt. % maleic anhydride
[e]Procedure of step (a). EPSYN ® 55 resin, grafted with 2.3 wt. % GMA
[f]Procedure of step (a), EPSYN ® 55, grafted with 2.0 wt. % GA The results indicate that vastly improved impact strength can be obtained by incorporating EPDM-g-GMA or EPDM-g-GA/GMA terpolymers into PBT compositions, in comparison with EP rubbers grafted with other polar monomers. Double extrusion of Example 1 raises the notched Izod value to 18.7 ft.lbs./in. of notch.

EXAMPLES 3–7

(a) Rubber grafted materials are prepared following the procedure of step (a) in Examples 1 and 2 but using only glycidyl methacrylate as the grafting monomer. The compositions made and their properties are set forth in Table 2.

TABLE 2

| EPDM-grafted glycidyl methacrylate terpolymers | | | | | |
|---|---|---|---|---|---|
| Procedure | 3A | 3B | 3C | 3D | 3E |
| Compositions (parts by weight) | | | | | |
| EPDM A 4906 | 100 | 100 | — | — | — |
| EPDM B 55 | — | — | 100 | 100 | 100 |

TABLE 2-continued

| EPDM-grafted glycidyl methacrylate terpolymers | | | | | |
|---|---|---|---|---|---|
| Procedure | 3A | 3B | 3C | 3D | 3E |
| Hexane | 300 | 300 | 400 | 400 | 400 |
| GMA | 2.5 | 10 | 1.5 | 1.5 | 1.5 |
| Initiator A[a] | 1.5 | 3 | 1.5 | 2.5 | 2.5 |
| Properties | | | | | |
| RSV | 2.44 | 2.46 | 3.10 | 4.28 | 2.57 |
| Bound GMA, % | 2.60 | 2.76 | 1.51 | 1.88 | 2.26 |
| Gel Content (wt. percent) | 5 | 5 | 5 | 5 | 5 |

[a]dicumyl peroxide. DiCup ®. Hercules Company (b) 20 parts by weight of each elastomeric material of Procedures 3A-3E are tumble blended with 80 parts by weight of poly(1,4-butylene terephthalate) and 0.3 parts by weight of antioxidant and passed through a ⅜" Killion single screw extruder at extruder barrel and die temperatures of 250° C. and screw speed of 100 rpm. The water cooled strands are comminuted, dried, passed through the extruder a second time under identical conditions and pelletized. The pellets are dried and molded into ⅛" test pieces on a 75 ton Newbury injection molding machine at a barrel temperature of 260° C. and a mold temperature of 65° C. Test results for blends containing the elastomeric materials are shown in Table 3.

TABLE 3

| Thermoplastic Compositions PBT/EPDM-g-GMA terpolymers | | | | | |
|---|---|---|---|---|---|
| Example | 3 | 4 | 5 | 6 | 7 |
| Composition (parts by weight) | | | | | |
| PBT | 80 | 80 | 80 | 80 | 80 |
| Elastomeric Material (Bound GMA Content, %) | | | | | |
| Procedure 3A (2.6) | 20 | — | — | — | — |
| Procedure 3B (3.4) | — | 20 | — | — | — |
| Procedure 3C (1.51) | — | — | 20 | — | — |
| Procedure 3D (1.88) | — | — | — | 20 | — |
| Procedure 3E (2.26) | — | — | — | — | 20 |
| Properties | | | | | |
| Notched Izod Impact (ft. lb./in.) | 15.4 | 18.8 | 3.5 | 2.2 | 18.6 |
| Unnotched Double Gate Izod (ft. lb./in.) | 6.9 | 2.1 | 7.3 | 10.7 | 1.8 |

The results listed in Table 3 shown that high Izod impact values in these blends are only achieved when the grafted EPDM rubbers have greater than 2.0% bound GMA content.

PROCEDURE 4A 100 parts by weight of backbone rubber B; 0.1 part by weight of antioxidant; 8 part by weight of glycidyl methacrylate; and 0.8 parts by weight initiator B are passed through a WP30 twin screw extruder. Zone temperatures are 200° C., the die temperature is 200° C., and screw speed is 150 rpm. The water cooled strands of elastomeric material are chopped into pellets. Analysis of the pellets indicates 5.86 weight percent glycidyl methacrylate and 17% by weight gel content.

PROCEDURE 4B 100 parts by weight of backbone rubber B; 0.1 parts by weight of antioxidant; 7.4 parts by weight of glycidyl methacrylate; and 0.74 parts by weight initiator B are passed through a WP57 twin screw extruder. Zone temperatures are 200° C., the die temperature is 200° C., and screw speed is 160 rpm. The water cooled strands of elastomeric material are chopped into pellets. Analysis of the pellets indicates 5.4 weight percent glycidyl methacrylate and 29% by weight gel content.

EXAMPLE 5

75 weight part of the elastomeric material from Procedure 4A and 25 weight parts of poly(1,4-butylene terephthalate) resin are passed through a Werner-Pfleiderer WP30 twin screw extruder at zone temperatures of 230° C., a die temperature of 230° C. and a screw speed of 145 rpm. The resulting water cooled strands of elastomeric material concentrate are chopped into pellets. A composition according to this invention is obtained.

EXAMPLES 6 AN 7

33.1 parts by weight of poly(1,4-butylene terephthalate) resin; 100 parts by weight of backbone rubber B; 0.1 parts by weight antioxidant; 7.5 parts by weight glycidyl methacrylate; and 0.75 parts by weight initiator B ar tumble blended and passed through a 1" Killion extruder having an L/D ratio of 20/1. Zone temperatures are 220° C., the die temperature is 205° C. and screw speed is 30 rpm. The air cooled strands of elastomeric material are chopped into pellets. Bound glycidyl methacrylate and gel content were not directly measured. A composition according to this invention is obtained.

A backbone rubber grafted under equivalent conditions, i.e., absent poly(1 4-butylene terephthalate) resin and at lower zone temperatures of 205° C. has a gel content of 15% and bound glycidyl methacrylate content of 7 weight %. If this is melt blended with poly(1,4-butylene terephthalate) a composition according to this invention will be obtained.

EXAMPLE 8

33.1 parts by weight of poly(1,4-butylene terephthalate) resin, 100 parts by weight of a backbone rubber B, 0.1 parts by weight antioxidant, 7.5 parts by weight of glycidyl methacrylate; and 0.75 parts by weight of initiator B, are passed through a WP30 twin screw extruder. Zone temperatures are 230° C., the die temperature is 230° C., and screw speed was 145 rpm. The initiator is dissolved in the glycidyl methacrylate and metered into the hopper through a gear pump. The water cooled strands of elastomeric material concentrate are chopped into pellets. Bound glycidyl methacrylate content is measured to be 6.1% by weight and equivalent gel content is estimated to be 15%. If 26.7 parts by weight of this composition is melt blended with 73.3 parts by weight of PBT, a composition in accordance with the present invention will be obtained.

EXAMPLES 9-11

(a) 100 parts by weight of backbone rubber B; 0.1 parts by weight of antioxidant; 7.4 parts by weight of glycidyl methacrylate; and 0.56 parts by weight of initiator B are passed through a WP57 twin screw extruder. Zone temperatures are 200° C.; and screw speed is 150 rpm. The water cooled strands of elastomeric material are chopped into pellets. Analysis of the pellets indicated 4.5 weight percent bound GMA and 21% gel.

(b) The elastomeric material of step (a) is tumble blended with poly(1,4-butylene terephthalate) resin and antioxidant in varying proportions as shown in Table 4. The blended mixtures are passed through a WP28 twin screw extruder at a zone temperature of 240° C., die temperature of 240° C. and screw speed of 300 rpm. The water cooled strands are pelletized. The pellets are dried and molded into ⅛" test pieces. Compositions and test results are shown in Table 4.

TABLE 4

Thermoplastic Compositions PBT/EPDM-g-GMA terpolymers

| Example | 9 | 10 | 11 |
|---|---|---|---|
| Composition (parts by weight) | | | |
| PBT | 90 | 85 | 80 |
| Elastomeric material (step (a)) | 10 | 15 | 20 |
| Antioxidant | 0.3 | 0.3 | 0.3 |
| Properties | | | |
| Notched Izod Impact (ft. lb./in.) | 2.4 | 12.4 | 15.5 |
| Double Gate Unnotched Izod (ft. lb./in.) | 20 | 20 | 20 |
| Tensile Modulus (psi × 10³) | 283 | 253 | 216 |

The results of Table 4 indicate that the notched Izod strength of these compositions falls off dramatically below 15% elastomer content.

EXAMPLES 12–14

Blends of PBT/EPDM-g-GMA, 80:20 percent by weight, respectively, are prepared following the procedure of Examples 3–7. All blends were extruded twice on a single screw machine. The compositions employed and the results obtained are set forth in Table 5.

TABLE 5

Thermoplastic Compositions: PBT/EPDM-g-GMA Blends

| Example | 12 | 13 | 14 |
|---|---|---|---|
| Composition (parts by weight) | | | |
| Poly(1,4-butylene terephthalate)[a] | 80 | 80 | 80 |
| Rubber (EPDM) | | | |
| EPDM-g-GMA[b] | 20 | 20 | — |
| EPDM-g-GMA[c] | — | — | 20 |
| Graft RSV[d] | 2.43 | gel* | gel* |
| Percent (%) GMA | 2.36 | 5.86 | 4.18 |
| Properties | | | |
| Notched Izod Impact (ft. lb./in.) | 17.8 | 15.5 | 16.3 |
| Unnotched Double Gate (ft. lb./in.) | 2.3 | 20 | 20 |

[a]VALOX ® 315, General Electric Company
[b]Backbone Rubber is EPDM B
[c]Backbone Rubber is EPDM C
[d]Rubber solution viscosity, dl/g.
*Rubber had a degree of crosslinking >15% which prevented solution viscosity testing. All others had gel levels under 5%.

The results indicate that high notched Izod and double-gate impact (a measure of knit-line strength) are obtained for impact-modified PBM compositions where the rubber has combined high GMA contents with the presence of a significant amount of gel (>15%).

EXAMPLES 15–17

The procedure of Examples 12–14 is followed except that in Examples 17 the rubber is pelletized in an extruder before blending with PBT, extrusion and molding into compositions. Compositions and results are set forth in Table 6:

TABLE 6

Thermoplastic Compositions Effect of Pelletization

| Example | 15 | 16 | 17 |
|---|---|---|---|
| Compositions (parts by weight) | | | |
| Poly(1,4-butylene terephthalate) | 80 | 80 | 80 |
| G162 (as prepared)[a] | 20 | — | — |
| G196 (as prepared)[b] | — | 20 | — |
| G196 (pelletized)[b] | — | — | 20 |
| Percent GMA (%) | 3.2 | 3.0 | 3.0 |
| Percent (%) Gel | 3 | 3 | 70 |
| Properties | | | |

TABLE 6-continued

Thermoplastic Compositions Effect of Pelletization

| Example | 15 | 16 | 17 |
|---|---|---|---|
| Notched Izod Impact | 16.0 | 11.8 | 12.8 |
| Unnotched DG Impact | 2.2 | 1.9 | 15.8 |

[a]EPSYN ® 55, 3.2% GMA, 3% gel as prepared
[b]EPSYN ® 55, 3.0% GMA, 3% gel as prepared. 70% gel after pelletizing by two passes through an extruder.

The results indicate that raising the gel content via pelletization is an effective way of improving knit-line strength.

EXAMPLES 18–20

The procedure of Examples 12–14 is followed except that the EPDM-g-GMA rubber possesses a gel content of 29% and a grafted GMA content of 5.4%. As in Examples 12–14, these grafted EPDM's were used in 80:20 PBT/rubber blends except that the extrusion treatments were varied. Treatments and results are set forth in Table 7.

TABLE 7

Thermoplastic Composition: Effect of Extrusion Treatment

| Example | 18[a] | 19[b] | 20[c] |
|---|---|---|---|
| Properties | | | |
| Notched Izod Impact (ft. lb./in.) | 14–16 | 15–16 | 13–14 |
| Unnotched Double Gate Impact (ft. lb./in.) | 2–3 | 20 | 20 |

[a]1 × extrusion on WP 28 twin screw extruder
[b]1 × extrusion on WP 28 twin screw extruder plus 1 ×

The results in Table 7 indicate that an increase in working, i.e., extrusion steps improves the knit-line strength. Care must be taken, however, not to impart so much energy in working the polymer so that the composition is degraded due to heat and shear effects.

EXAMPLES 21–22

Molded articles prepared for testing from the compositions of Examples 19 and 20 were examined under a scanning microscope (SEM). For this, the workpieces were microtomed and etched in boiling toluene to remove the EPDM-g-GMA phases.

A computerized particle size analyzer was used to determine individual and average EPDM-g-GMA particle diameters from the SEM photomicrographs. Equivalent sphere volumes were then calculated from the diameters. Finally, the weight percent of EPDM-g-GMA (equivalent to volume percent in a single phase rubber) in particles larger than 1 micron (the upper limit of Epstein, U.S. Pat. No. 4,172,859) was calculated. Results are set forth in Table 8:

TABLE 8

Thermoplastic Compositions: Computerized Particle Size Analysis

| Example | 21 | 22 |
|---|---|---|
| Parameter | | |
| Mean Particle Diameter, microns | 0.590 | 0.461 |
| Particle Diameter Range, microns | 0.02–2.36 | 0.07–1.77 |
| Weight Percent of Particles Larger than 1 Micron in diameter | 81.1 | 52.9 |

The results in Table 8 indicate that the better notched Izod and knit-line strengths were found in the compositions that had over 80 weight percent of the rubber in particles larger than 1 micron in diameter. The 2× extrusion treatment decreases the average particle size significantly, and impact strength was slightly lower, but still over 50 weight percent of the rubber was in particles larger than 1 micron.

EXAMPLE 23

The base rubber is the EPDM of Example 1. The rubber feed rate was 6.6 pounds per hour to a Werner & Pfleiderer ZSK twin screw extruder operating at a barrel temperature of 200° C. and a screw speed of 150 rpm. Glycidyl methacrylate initiator and 2,5-dimethyl-2,5-di(t-butylperoxy) hexane were fed continuously at rates of 7.6 parts per hundred GMA and 0.40 parts per hundred initiator per 100 parts by weight EPDM. The resulting reaction product had a gel content of 10%.

A most important concept of this invention resides in the inclusion of a fraction of a polyester matrix resin as a fourth component for concurrent reaction with the EPDM, methacrylate and/or acrylate and initiator to produce what can be referred to as a "masterbatch" adapted subsequently to be blended with the remainder of the matrix resin as illustrated in Examples 6-9 of the application. In the absence of the small amount of the polyester (matrix) resin, the impact modifier tends to agglomerate making it difficult in subsequent processing such as handling measuring and mixing the impact modifier with the matrix resin for uniform dispersion therein. The inclusion of a fraction of the polyester resin as a fourth component in the reaction results in a pliable product that can be easily reduced to particulate form for handling and distributing in subsequent processing steps.

In addition, it has been found that the presence of a small amount of the matrix resin as a component of the reaction, results in reaction which differs somewhat from the reaction that takes place in the absence of the polyester and results in a masterbatch which appears to provide for a better blend with the matrix resin with which it is subsequently combined to provide an improved thermoplastic composition having improved properties.

The described improvements can be achieved when the reaction is carried out in combination in which 10-80 percent by weight and preferably 20-50 percent by weight of the total amount of polyester or other matrix resinous component of the final blend product. This intermediate, which contains a part of the matrix resin as a fourth component of the reaction, is referred herein as a masterbatch with which the remainder of the matrix resin is blended. Optimum results are secured when the unsaturated rubber component (EPDM) and matrix resin (polyester) are present in the masterbatch in the weight ratio of 50-80 parts by weight of the rubber polymer to 50-20 parts by weight of the matrix resin, and preferably 60-80 parts by weight of the rubber polymer to 40-20 parts by weight matrix resin.

The above patents and publications are incorporated herein by reference.

Many variations will suggest themselves to those skilled in the art in light of the above, detailed description. For example, instead of using poly(1,4-butylene terephthalate) as component (a), other polyester resins, such as poly(ethylene terephthalate) or copolyesters derived from one or more aliphatic and/or aromatic dicarboxylic acids and one or more straight or branched chain aliphatic or cycloaliphatic glycols including random or block copolyesters. Instead of injection molding, blow molding, including injection blow molding can be used. Instead of a mixture of glycidyl methacrylate and methyl methacrylate a mixture of gylcidyl acrylate and methyl methacrylate or a mixture of glycidyl methacrylate and octadecyl metacrylate can be used. Furthermore other additives known to those skilled in the art may be added in conventional amounts to the impact modified compositions herein including but without limitation, nucelating agents mold release agents, flow promoters, coloring agents, flame retardants, coupling agents and stabilizers.

All such obvious variations are within the full intended scope of the appended claims.

What is claimed is:

1. The method of producing a thermoplastic polyester based composition having improved knit-line strength and impact strength comprising:
    (a) providing a masterbatch by reacting:
        (1) less than the full increment of a high molecular weight thermoplastic polyester matrix resin;
        (2) a rubber polymer in the molten phase selected from the group consisting essentially of the interpolymerization reaction product of ethylene, one or more $C_3$-$C_{16}$ mono-olefins and a polyene;
        (3) a composition selected from the group consisting of an epoxy functional acrylate, an epoxy functional methacrylate, an epoxy functional acrylate in combination with a $C_1$-$C_{18}$ alkyl acrylate, and an epoxy functional methacrylate in combination with a $C_1$-$C_{18}$ alkyl acrylate; and
        (4) an initiator present in an amount of at least 0.3 percent by weight of the rubber polymer to provide a reaction product having a gel content in the range of from about 10 to about 80 percent; and
    (b) thereafter melt blending the masterbatch with the remainder of the high molecular weight thermoplastic matrix resin.

2. The method as claimed in claim 1 in which the rubbery polymer is formed by the interpolymerization of ethylene, propylene and 5-ethylidene-2-norbornene.

3. The method as claimed in claim 2 in which the ethylene and propylene are present in the bound state in the ratio of 10-95 moles ethylene to 90-5 moles propylene.

4. The method as claimed in claim 1 in which the polymer is present in an amount to provide up to 20 C=C groups per 1000 carbon atoms in the rubbery interpolymer.

5. The method as claimed in claim 1 in which the component (3) is glycidyl methacrylate.

6. The method as claimed in claim 1 in which the component (3) is glycidyl acrylate.

7. The method as claimed in claim 1 in which the component (3) is reacted in an amount of at least 2 percent by weight of the rubbery interpolymer.

8. The method as claimed in claim 7 in which the component (3) is reacted in an amount within the range of 2-15 parts per 100 parts by weight of the rubbery interpolymer.

9. The method as claimed in claim 1 in which the polyester resinous component (1) is present in an amount within the range of 10-80 percent by weight of the polyester resin present in the final product.

10. The method as claimed in claim 1 in which the masterbatch is formulated to contain 20-50 percent by weight of the polyester resin in the final product.

11. The method as claimed in claim 1 in which the ratio of rubbery interpolymer to polyester resin in the masterbatch is within the range of about 50-80 parts by weight rubbery interpolymer to 50-20 parts by weight of the polyester resin.

12. The method as claimed in claim 1 in which the initiator is a peroxide catalyst present in an amount within the range of about 0.3 to about 3.0 percent by weight of the rubbery interpolymer.

13. The method as claimed in claim 1 in which the dispersed phase is present in the final product in the form of particles in which more than about 60 percent by weight of the particles are larger than 1 micron.

14. A polyester based thermoplastic composition having improved knit-line strength and impact strength produced by the method of claim 1.

15. A polyester based thermoplastic composition having improved knit-line strength and impact strength comprising the product produced by melt blending a polyester resinous matrix with a masterbatch in the form of the reaction product of:
   (1) less than the full increment of a high molecular weight thermoplastic polyester matrix resin;
   (2) a rubber polymer in the molten phase selected from the group consisting essentially of the interpolymerization reaction product of ethylene, one or more $C_3$-$C_{16}$ mono-olefins and a polyene;
   (3) a composition selected from the group consisting of an epoxy functional acrylate, an epoxy functional methacrylate, an epoxy functional acrylate in combination with a $C_1$-$C_{18}$ alkyl acrylate, and an epoxy functional methacrylate in combination with a $C_1$-$C_{18}$ alkyl acrylate; and
   (4) an initiator present in an amount of at least 0.3 percent by weight of the rubber polymer to provide a reaction product having a gel content in the range of from about 10 to about 80 percent, being in the form of particles in which more than about 60 percent by weight of the particles are larger than one micron.

16. A polyester based thermoplastic composition as claimed in claim 15 in which the rubbery polymer is formed by the interpolymerization of ethylene, propylene and 5-ethylidene-2-norbornene.

17. A polyester based thermoplastic composition as claimed in claim 15 in which the ethylene and propylene are present in the bound state in the ratio of 10-95 moles ethylene to 90-5 moles propylene.

18. A polyester based thermoplastic composition as claimed in claim 15 in which the polymer is present in an amount to provide up to 20 C=C groups per 1000 carbon atoms in the rubbery interpolymer.

19. A polyester based thermoplastic composition as claimed in claim 15 in which the component (3) is glycidyl methacrylate.

20. A polyester based thermoplastic composition as claimed in claim 15 in which the component (3) is glycidyl acrylate.

21. A polyester based thermoplastic composition as claimed in claim 15 in which the component (3) is reacted in an amount of at least 2 percent by weight of the rubbery interpolymer.

22. A polyester based thermoplastic composition as claimed in claim 1 in which the component (3) is reacted in an amount within the range of 2-15 parts per 100 parts by weight of the rubbery interpolymer.

23. A polyester based thermoplastic composition as claimed in claim 15 in which the polyester resinous component is present in the masterbatch in an amount corresponding to 20-50 percent of the polyester resinous components in the final product.

24. A polyester based thermoplastic composition as claimed in claim 15 in which the ratio of rubbery interpolymer to polyester resin in the masterbatch is within the range of about 50-80 parts by weight rubbery interpolymer to 50-20 parts by weight of the polyester resin.

25. A polyester based thermoplastic composition as claimed in claim 15 in which the initiator is a peroxide catalyst present in an amount within the range of about 0.3 to about 3.0 percent by weight of the rubbery interpolymer.

* * * * *